Figure 1:
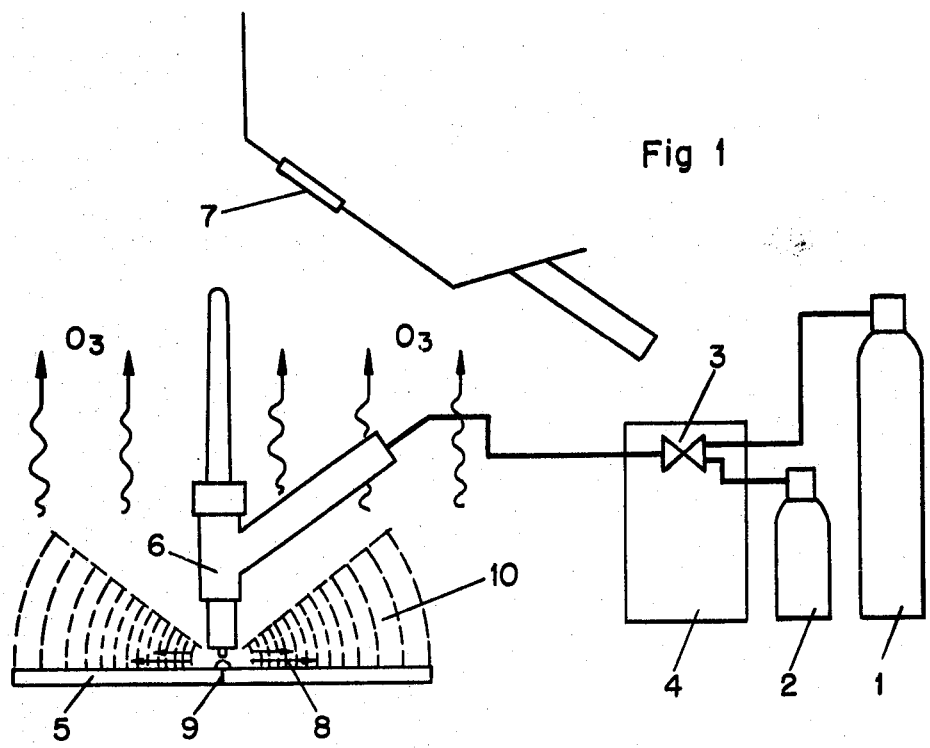

United States Patent [19]

Selander et al.

[11] 4,292,493
[45] Sep. 29, 1981

[54] METHOD FOR DECOMPOSING OZONE

[75] Inventors: Lennart Selander, Bålsta; Lars Fahlén, Vällingby; Ladislav Sipek, Täby, all of Sweden

[73] Assignee: AGA Aktiebolag, Sweden

[21] Appl. No.: 54,923

[22] Filed: Jul. 5, 1979

Related U.S. Application Data

[63] Continuation-in-part of Ser. No. 849,390, Nov. 7, 1977, abandoned.

[30] Foreign Application Priority Data

Nov. 5, 1976 [SE] Sweden .............................. 7612355

[51] Int. Cl.³ ............................................. B23K 9/16
[52] U.S. Cl. .................. 219/74; 219/137 R; 252/372; 252/374
[58] Field of Search ............. 219/74, 137 R; 252/372, 252/374

[56] References Cited

U.S. PATENT DOCUMENTS

| | | | |
|---|---|---|---|
| 1,746,209 | 2/1930 | Alexander | 219/74 |
| 2,497,631 | 2/1950 | Rothschild | 219/74 |
| 2,576,793 | 11/1951 | Jordan | 219/74 X |
| 2,658,981 | 11/1953 | Martin | 219/74 |
| 2,688,097 | 8/1954 | Friedman | 252/372 X |
| 3,133,348 | 5/1964 | Cape | 219/74 X |
| 3,242,569 | 3/1966 | Petry | 219/74 |
| 3,349,215 | 10/1967 | Wagenleitner | 219/74 |
| 4,095,080 | 6/1978 | Ueyama | 219/74 |

FOREIGN PATENT DOCUMENTS 267217  4/1966  Australia .............................. 219/74

*Primary Examiner*—Richard R. Kucia
*Attorney, Agent, or Firm*—Larson and Taylor

[57] ABSTRACT

In welding or working operations using an electric arc a nitrogen compound is introduced into the working or welding area for the purpose of decomposing ozone in said area. The nitrogen compound is preferably purely nitric oxide, but may also be nitrous oxide ($N_2O$) or ammonia ($NH_3$).

13 Claims, 2 Drawing Figures

U.S. Patent  Sep. 29, 1981  4,292,493

METHOD FOR DECOMPOSING OZONE

This application is a continuation-in-part of Applicants' co-pending Application Ser. No. 849,390, filed Nov. 7, 1977 now abandoned.

The present invention relates to a method for reducing the formation of ozone during electric arc welding or other working operations carried out using an electric arc.

As is well known, ozone is an extremely poisonous gas. In the majority of countries, the highest permitted ozone concentration at working sites is in the range of 0.05–0.1 ppm. Ozone can be formed from oxygen in the air by various reactions, but primarily by a photochemical reaction with ultraviolet (UV) radiation. When using an open electric arc for welding, cutting or other operations, the UV-radiation formed is sufficiently strong to give rise to the formation of measurable quantities of ozone, both in the immediate vicinity of the arc and in the surrounding atmosphere. Normally, ozone is formed photochemically by the dissociation of the oxygen molecule in accordance with the reaction formulae:

$$O_2 + (h\nu) \rightarrow O + O \text{ and } O_2 + O \rightarrow O_3$$

where h is Plancks constant and $\nu$ is the frequency of the UV-radiation.

The dissociation energy of the oxygen molecule is approximately 5 eV and consequently only radiation wavelengths shorter than approximately 220 nm take part in the photochemical production of ozone. The maximum dissociation of oxygen takes place at wavelengths of 130–180 nm. By the dissociation process, these wavelengths are practically completely absorbed in the air within a distance of some millimeters or centimeters. Consequently, the highest concentration of ozone is generated in the immediate vicinity of the arc and thus in the breathing zone of the operator. It has been found by experience that, in welding, the amount of ozone formed depends upon the welding method used, the welding parameters, such as the length of the arc, the welding rate and the type of protective gas used (if any), and the material of the workpiece being welded. Not infrequently, completely unacceptable concentrations of ozone are formed, necessitates measures being taken to reduce such concentrations. The most readily conceivable solution to this problem is to dilute the ozone by ventilation with additional air, either at random locations in or throughout the entire working area. These solutions, however, are cumbrous. If ventilation at random locations is to have any appreciable effect, relatively large quantities of air flowing at relatively high speeds, must be used. This would, however, disturb the welding process, which is often carried out in an atmosphere of a protective gas. A further disadvantage with random ventilation is that it is difficult to control under varying working conditions. Poor ventilation in combination with draughts often causes a dangerous concentration of ozone to be swept through the breathing zone of the welder, which would not occur if ventilation were not used.

The removal of air from the welding zone by suction at locations remote from the arc is also unsatisfactory in certain respects. In this case also, the suction force used must not be excessive so as not to disturb the welding process. This is particularly true in welding processes carried out using protective gas. Moreover, suction inhibits movements of the welding torch used, which becomes particularly noticeable in mannual welding. In addition, the application of suction itself gives rise to technical problems.

Another disadvantages of applying suction at locations remote from the arc becomes manifest when welding is carried out using consumable electrodes or coated electrodes. As is well known, these methods sometimes produce a somewhat smaller concentration of ozone as compared with welding methods in which nonconsumable electrodes are used. One of the reasons for this lower concentration of ozone is the protective effect against the formation of ozone afforded by the formation of smoke. The smoke absorbs UV-radiation which would otherwise produce ozone. In addition, the concentration of ozone is also reduced chemically by the smoke particles. When the smoke is removed, its protective effect with respect to ozone is of course lost.

BACKGROUND ART

Methods are known to the art in which nitrogen compunds and other compounds which will decompose to form ozone-decomposing substances are fed to the vicinity of the welding or working arc. Attention is drawn in this respect, by way of example, to Australian Pat. No. 267,217, German Pat. Nos. 1 016 865, 1 039 675 and 496 337 and to U.S. Pat. Nos. 313,348, 2,576,783, and 3,243,569.

For example, Australian Patent Specification discloses an improvement in gas shielded arc-welding processes in which the shielding gas contains a minor percentage of nitrous oxide ($N_2O$). The overall percentage of $N_2O$ is governed by the amounts of denitriding and/or deoxidizing and/or fluxing materials used, and is stated to be from 0.5% to 20% by volume of the shielding gas. Although such quantities will be sufficient to reduce ozone in the immediate vicinity of the welding arc, they are harmful to the weld produced. For example, quantities of $N_2O$ in excess of 0.1% when TIG welding will cause the electrode to burn up, whilst quantities of more than 0.5% in MIG welding will result in a poor weld.

The compounds described in the aforementioned specifications are not intended for the express purpose of decomposing ozone in the welding area. In order to be truly effective they must be fed into the arc itself and then converted into purely nitric oxide.

Experiments have shown that the production of ozone reaches a peak within a few thousandths of a second after the arc has been lit, and may even be present in the welding area before the arc is lit. Thus, before the said compounds have decomposed to form a substance which will react directly with ozone, the welder has been subjected to excessive amounts. In addition, many of the compounds known to be introduced to the welding arc for one purpose or the other, but not for the purpose of reducing ozone, produce gases which are far more harmful than ozone itself.

One object of the invention is to provide a method when working with an electric arc by which ozone can be effectively decomposed in the welding area without deleteriously affecting the weld of, when cutting, the cut surfaces.

In the method of the invention there is introduced into the welding or working area a nitrogen compound which is preferably nitric oxide, but which in certain cases may also be nitrous oxide or ammonia ($NH_3$). If added in limited amounts, it had been found that N₂O and NH₃ will assist in decomposing O₃ to acceptable limits without affecting the weld. By welding area is meant here an area extending from the immediate vicinity of the arc to a location removed some distance therefrom.

Conveniently, the nitric oxide is introduced into the welding area at a rate not exceeding 100 ml/min., and preferably betweem 1 ml/min–30 ml/min. Although the nitric oxide will react with the ozone to form nitrogen dioxide ($NO_2$), which is in itself a pollutant, this can be accepted, because whilst the international threshold limit for $O_3$ is as low as 0.1 ppm (0.2 mg/m³) the corresponding limit for $NO_2$ is as high as 5 ppm (9 mg/m³).

The nitric oxide may be introduced into the welding or working area in a pure form, or together with a shielding gas. For example, the NO may be mixed with the shielding gas within the welding torch itself, or in the gas line leading thereto, or may be charged to said area in a pure form and there become mixed with the gas by convection currents. By passing a part of the shielding gas containing nitric oxide to a location in the welding or working area remote from the vicinity of the arc, the additional safeguard is obtained whereby any residual ozone, which by chance has not reacted, will come into contact with further amounts of nitric oxide, thereby to be decomposed.

Nitrous oxide is introduced into the welding or working area in mixture with a shielding gas, said nitrous oxide being present in an amount not exceeding 0.45% of the gas. Whilst amounts of this magnitude do not deleteriously affect the workpiece or the electrode, they are effective to reduce the amount of ozone in the working area to a safe level.

When the welding or working operation is carried out in the presence of a shielding or protective gas, the gas may contain at least two of the aforementioned NO, $N_2O$ or $NH_3$ in mixture, although the amount of $N_2O$ must not exceed 0.45% of the gas.

Decomposition of ozone in the vicinity of the arc can also be accomplished by coating the electrode and/or the workpiece with a nitrate, such as ammonium nitrate $NH_4NO_3$.

The method of reducing or even eliminating the formation of ozone in accordance with the invention can be carried out with various means, depending upon the welding or other operating method being used, or in other circumstances connected with the welding or other operating process. Various ways of carrying out the method of the invention will now be described with reference to examples which further illustrate the invention.

As will be apparent from the brief description of the invention given above, the method of reducing the formation of ozone according to the invention does not suffer from the disadvantages encountered with hitherto known suction and evacuating methods.

The invention will now be further described in more detail with reference to apparatus for carrying out the method in which a shielding gas is used.

Figure 2:
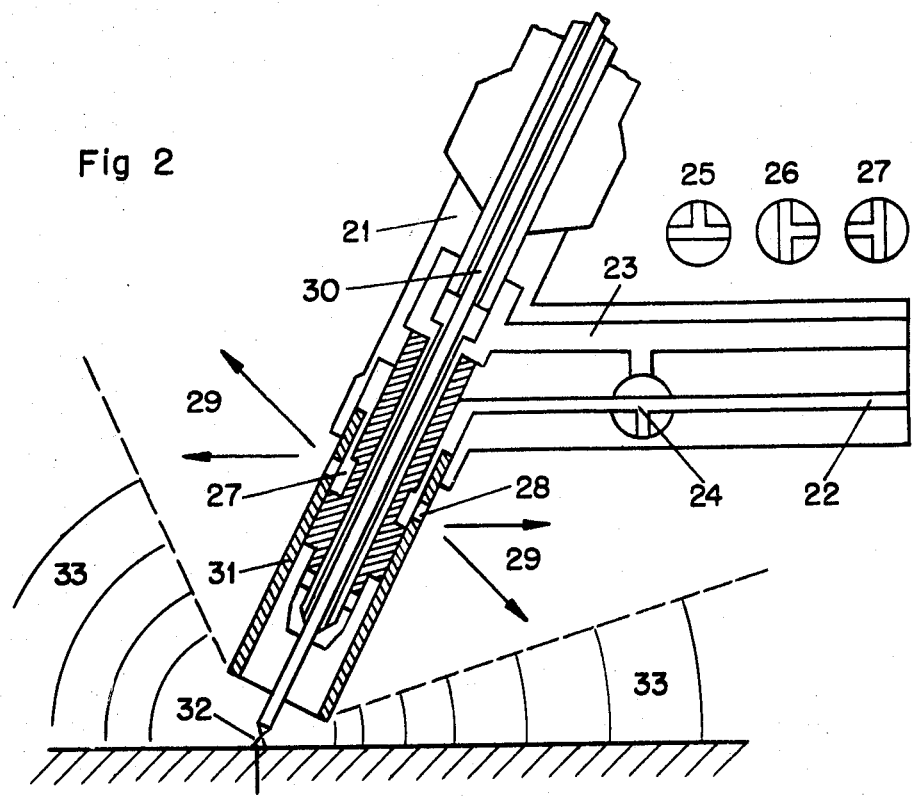

In the accompanying schematic drawing,

FIG. 1 is a schematic side-sectional view of a welding arrangement to illustrate the application of the method of the invention; and FIG. 2 is a schematic side-sectional view of a further arrangement for carrying out the invention.

As mentioned, the method of the invention will be described primarily with reference to its application to arc welding in a protective gas environment. When welding in an inert gas atmosphere, there is either a non-consumable tungsten electrode (TIG-welding) or a consumable electrode (MIG-welding) used. In the latter case, it is sometimes convenient to use an active rather than an inert gas (MAG-welding). Even though the invention will be described with reference to TIG-welding) it will be obvious to any one skilled in the art that it can also be applied to MIG-welding and MAG-welding, and indeed to arc welding without the use of a shielding gas, and to operations other than welding arc, such as arc-cutting.

Referring to FIG. 1, a gas cylinder 1 contains an inert gas or inert gas mixture, whilst a gas cylinder 2 contains a nitrogen compound, i.e. NO, $N_2O$ or $NH_3$, which, in accordance with the invention is caused to react with ozone formed in the vicinity of the arc. The compound is fed in the form of a gas or vapour to a regulating means, such as a valve 3, which can be located, for example, in a source of welding current 4. The regulating means 3 is arranged to mix the compound with the protective gas in the desired concentration. The resulting mixture is fed to a welding torch 6 and flows therethrough to a workpiece 5 and to the area surrounding the torch in the directions indicated by arrows 8. The arc burning between the electrode on the torch and the workpiece 5 produces ozone in the vicinity of the torch as a result of UV-radiation of the air. The irradiated space 10 is indicated by dashed lines. In addition to this irradiation, the air is normally heated to a certain extent in this area, the heated air rising upwardly into the breathing zone of the welder behind a welding shield 7. Consequently, under normal conditions, the welder may well breathe in air which has a relatively high content of ozone. If the protective gas is now mixed, in accordance with the invention, with nitric oxide, nitrous oxide or ammonia ($NH_3$), or a mixture of such substances, this substances will flow, together with the inert gas, into the vicinity of the arc. The nitrogen-component is thus caused to react with the ozone formed in accordance with the reaction $NO+O_3 \rightarrow N_2+O_2 \rightarrow NO+O_2$. This leads to a reduction in, or possibly even to the elimination of, the ozone in the airstream rising upwardly into the breathing zone of the welder.

Practical tests have been carried out with argon as the protective gas at a flow rate of 10 l/min. An addition of merely 1 ml/min to 30 ml/min of nitric oxide to the argon results in the majority of cases in an appreciable reduction of the concentration of ozone in the vicinity of the torch. In order to substantially completely eliminate the ozone, even under the most unfavourable welding conditions (a large welding current, a long arc, aluminium as the material to be welded), a nitric oxide addition in a concentration of up to 100 ml/min is sufficient.

When carrying out the method of the invention, such vapours may be added to the protective gas stream in the desired concentrations by any known technique. The compounds $N_2O$ and $NH_3$ above do not decompose to form the active component nitric oxide until they pass thorough the welding zone, where the active component formed reacts with ozone in accordance with the invention. However, these compounds will assist in decomposing ozone to relatively safe limits during initial welding stages. In this connection, it is necessary to take into account the fact that complete decomposition of the compound may not take place. This must be compensated for by increasing the concentration of the additive. For example, it has been found that when using nitrous oxide (often called "laughing gas") alone, or ammonia alone in TIG-welding under typical conditions, it is necessary to maintain the concentration of these substances in the protective gas at over 0.1% in order to obtain the desired reduction in the ozone formed. On the other hand, apart from any health hazard, the upper concentration limit is only determined by the metallurgical aspects of the welding process or by decomposition processes which may take place on the non-consumable electrode in TIG-welding. In practice, such decomposition processes often depend upon the presence of free or combined oxygen. It has been found that these disturbing processes can be reduced or even eliminated by adding suitable quantities of hydrogen to the protective gas. In general, the amount of hydrogen to be added is equal to the amount of the additive causing oxidation and is normally not greater than five times this amount, and not above 2%.

When using compounds which do not release the desired amount of nitric oxide until they decomposed, it is not necessary for such decomposition to take place in the welding zone. Alternative ways of carrying out the method of the invention are based on the use of a suitable converter connected at a suitable location in the protective gas supply line between the anti-ozone additive container and the torch. It is then thus possible to convert the additive to the desired form of nitric oxide in this converter. The decomposition can be effected much more effectively in a converter than in the welding zone. The use of a converter, which can be adapted to various compounds, also enables a suitable compound to be selected more readily. One such converter relies on the catalytic oxidation of ammonia ($NH_3$) on a hot platinum surface to form nitric oxide. The amount of oxygen required can be added to the protective gas, either as gaseous oxygen or in a combined form, such a nitrous oxide. As will be readily understood, a plurality of such converters can be used for carrying our different conversions.

The particular form of apparatus for carrying out the invention illustrated in FIG. 1 comprises two gas cylinders, one for a protective gas and one for an anti-ozone additive to be added to the protective gas. Both gases are mixed by a regulating means 3. It will be clear from what has been said that only one gas cylinder need be used instead of two, this single gas cylinder containing previously prepared protective gas mixture and the anti-ozone additive.

It will also be appreciated that it is not necessary when carrying out the method of the invention to pass the nitrogen compound through the arc and the welding zone. It is sufficient to feed these additives in any suitable manner to the vicinity of the actual welding zone. Naturally, this alternative method of proceeding cannot be used when the heat generated by the arc and the welding zone is required to break down a compound to form a nitric oxide. FIG. 2 shows in simplified form an apparatus for carrying out this alternative way of proceeding. A TIG-welding torch 21 is provided with two inlet gas passages 22 and 23. Protective gas is passed through the passage 23 to the body and flows downwardly through the torch around an electrode 30. The stream of protective gas leaves the torch through a gas nozzle 31 which directs it so as to protect a welding zone 32. The arc formed between the electrode tip and workpiece irradiates the surroundings of the torch in the shaded zone 33, in which the UV-component of the radiation from the arc produced ozone. Gas comprising an anti-ozone additive is passed through the passage 22 to a three-way valve 24. When the valve 24 is in the position illustrated, the gas is passed to a distributing chamber 27 and flows therefrom via openings 28 in the directions of arrows 29 into the irradiated zone 33, where the nitric oxide reacts with the ozone formed.

This alternative way of carrying out the invention can be used when two separate gas cylinders are used, one for the protective gas and one for a gas comprising the nitrogen compound, such as nitric oxide. It is convenient in certain cases to permit part of the gas comprising the nitrogen compound also to flow through the welding zone. For this purpose, the valve 24 is set in the postition 25 so that the compound is mixed with the protective gas in the passage 23. The postition valve is used when the whole of the anti-ozone additive shall pass through the arc and the welding zone.

When only gas cylinder is used containing a protective gas having the nitrogen compound mixed therewith, the arrangement shown in FIG. 2 can be neutralised by setting the valve 24 to the postition 27. It is of course unnecessary for the valve 24 to be located in the torch; it could equally well be located elsewhere, e.g. in the gas supply line. The gas stream containing the nitrogen compound can be conveniently regulated in the same manner as is the flow of protective gas in conventional TIG-welding arrangements.

Hitherto, the invention and its application have been described only with reference to TIG-welding. It will be obvious to one skilled in the art, however, that the invention can readily also be applied to plasma welding, or plasma cutting. When plasma welding, there is normally used two independent gas supply systems, one for plasma gas and one for a protective gas. The nitrogen compound can therefore be added either to one or to the other, or possibly to both of these gas supply systems. The plasma torch may be constructed in a similar manner to the torch illustrated in FIG. 2 for TIG-welding, i.e. in such a way that the anti-ozone additive can be reacted with the ozone formed without it being necessary to pass the additive through the arc or the welding zone.

It will also be obvious that the method of reducing or eliminating ozone in accordance with the invention can also be applied when MIG-welding. The situation then is even more simple than with TIG-welding, owing to the fact that less attention need be paid to electrode reactions. In addition, the limits of the concentration of the nitrogen compound within which it is possible to work can be widened. This allows extremely high ozone contents to be dealt with. Practically all known gas mixtures used in MIG- and MAG-welding can be provided with the same anti-ozone additives and in similar concentrations to those used in TIG-welding. In addition, in view of the fact that in MAG-welding, one or more of the gaseous components is an active gas (e.g. $O_2$ or $CO_2$), any one of these gases can be conveniently replaced by an anti-ozone additive which is chemically active to an approximately equal extent, e.g. nitrous oxide. In such a case, nitrous oxide concentrations of up to 0.45% can be used, optionally in combination with other known components.

Hitherto, the invention has been described with reference to its application in arc welding with a protective gas. The formation of ozone when arc welding can equally be reduced or eliminated by utilising the method of the invention when welding with coated electrodes. In distinction to the examples described above, in which nitric oxide is formed by the decomposition of gaseous compounds, nitric oxide can in this case be formed by the decomposition of solid compounds which are incorporated in the electrode coating. Certain nitrates (e.g. ammonium nitrates $NH_4NO_3$) are suitable for this purpose, these nitrates being decomposed by heat to give nitrous oxide, which itself can be further decomposed to form nitric oxide.

What has been said above with reference to the application of the invention when welding with coated electrodes also applies to the welding of workpieces with welding rods or wire containing a slag-forming material and/or other additives.

In those cases where it is not possible to use a coated electrode the coating of which contains an anti-ozone compound or is impregnated therewith, it is also possible in accordance with the invention to reduce the formation of ozone by treating the surface of the weld-joint and the surrounding surfaces and such compounds prior to welding. This way of proceeding can also be applied when welding in a protective-gas atmosphere, either alone or in addition to the provision of an anti-ozone additive in the protective gas.

We claim:

1. A method of decomposing ozone formed when welding or working with an electric arc, wherein a nitrogen compound is introduced into the welding or working area, said nitrogen compound being solely nitric oxide.

2. A method according to claim 1, wherein said nitric oxide is introduced into said area in an amount up to 100 ml/min.

3. A method according to claim 2 wherein said nitric oxide is introduced into said area in an amount corresponding to 1 ml/min–30 ml/min.

4. A method according to claim 1, in which a nitrogen compound higher than nitric oxide is first passed to a converter to produce nitric oxide, whereafter said nitric oxide is introduced into said welding or working area.

5. A method of decomposing ozone formed when welding or working with an electric arc together with protective gas, wherein a nitrogen compound is introduced into the welding or working area, said nitrogen compound being solely nitric oxide.

6. A method according to claim 5 wherein said nitric oxide is introduced into said area in an amount up to 100 ml/min.

7. A method according to claim 6 wherein said nitric oxide is introduced into said area in an amount corresponding to 1 ml/min–30 ml/min.

8. A method as claimed in claim 5, wherein the arc-welding process or working process is effected in an protective gas atmosphere, and said nitric oxide is first mixed with the protective gas and then dispered therewith to the said welding wording area.

9. A method as claimed in claim 8, wherein the mixing of said nitric oxide and said protective gas is effected within the burner.

10. A method as claimed in claim 8, wherein the nitric oxide is mixed with the protective gas in a protective-gas supply line located externally of the burner.

11. A method according to claim 5 in which a nitrogen compound higher than nitric oxide is first passed to a converter in which said compound is converted to nitric oxide, and said nitric oxide introduced into the welding area and together with said shielding gas.

12. A method of decomposing ozone formed when MIG-welding or working with an electric arc in the presence of a protective gas, wherein a nitrogen compound is introduced into the welding or working area, said nitrogen compound being solely $N_2O$ in an amount up to 0.45% of the protective gas.

13. A method of decomposing ozone formed when welding or working with an electric arc in the presence of a protective gas, comprising introducing into the welding or working area a gas containing a mixture of nitrogen compounds comprising at least two compounds taken from the group NO, $N_2O$ and $NH_3$, the content of $N_2O$ not exceeding 0.45% of the protective gas.

* * * * *